US00RE44403E

(19) United States
(12) Reissued Patent
McKay

(10) Patent Number: US RE44,403 E
(45) Date of Reissued Patent: Aug. 6, 2013

(54) METHOD OF REMOVING STATORS FROM TUBULAR STATOR HOUSINGS

(75) Inventor: John Russell McKay, Edmonton (CA)

(73) Assignee: Millennium Cryogenic Technologies Ltd., Edmonton, Alberta (CA)

(21) Appl. No.: 13/472,554

(22) Filed: May 16, 2012

Related U.S. Patent Documents

Reissue of:
(64) Patent No.: Re. 42,416
Issued: Jun. 7, 2011
Appl. No.: 12/002,271
Filed: Dec. 13, 2007

Which is a Reissue of:
(64) Patent No.: 6,973,707
Issued: Dec. 13, 2005
Appl. No.: 10/359,455
Filed: Feb. 5, 2003

(30) Foreign Application Priority Data

Feb. 8, 2002 (CA) ..... 2371155

(51) Int. Cl.
*H02K 15/00* (2006.01)

(52) U.S. Cl.
USPC ..... 29/596; 29/282; 29/426.5; 29/447; 29/762; 29/888.023; 29/888.46; 225/93.5

(58) Field of Classification Search
USPC ..... 29/596, 282, 426.6, 447, 762, 888.023, 29/888.46; 156/714; 225/93.5
See application file for complete search history.

(56) References Cited

U.S. PATENT DOCUMENTS

| | | | |
|---|---|---|---|
| 1,955,728 | A | 4/1934 | Allen |
| 1,980,156 | A | 10/1934 | Emrick |
| 2,028,407 | A | 1/1936 | Moineau |
| 3,724,059 | A | 4/1973 | Celovsky |
| 3,731,367 | A | 5/1973 | Laussermair et al. |
| 4,692,982 | A | 9/1987 | Rice |
| 4,739,622 | A | 4/1988 | Smith |
| 4,768,535 | A | 9/1988 | Marx et al. |
| 4,991,292 | A | 2/1991 | Bostel |
| 5,199,159 | A | 4/1993 | Waldsmith |
| 5,611,213 | A | 3/1997 | Rasovich |
| 5,755,284 | A | 5/1998 | Hart et al. |
| 5,974,656 | A | 11/1999 | Fernandez |

FOREIGN PATENT DOCUMENTS

| | | | |
|---|---|---|---|
| EP | 0 994 256 | A1 | 8/1999 |
| EP | 0 943 803 | A1 | 9/1999 |

OTHER PUBLICATIONS

York Cryogenics, www.yorkcryogenics.com.
Andrew McLeish, An Improved Process For The Cryogenic Grinding Of Flexible Polyurethane Foam, British Plastics & Rubber, Nov. 1995, p. 42-43.
Liz White, Wider Use Needs Quality Supply, European Rubber Journal, Feb. 1995, vol. 177, No. 2, p. 24-25.
Letter of Protest to the Canadian Intellectual Property Office, May 24, 2003.
Air Products Mini-Trim and Cryo-Trim Technology.
Canadian Judgement.
Email from Weatherford Artificial Lift System.

(Continued)

*Primary Examiner* — Thiem Phan
(74) *Attorney, Agent, or Firm* — Davis & Bujold, PLLC

(57) ABSTRACT

A method of removing stators from tubular stator housings involving subjecting a tubular stator housing having an interior surface to which a worn stator is adhered by adhesive to cryogenic refrigeration until the stator shrinks and pulls away from the interior surface of the tubular stator housing.

11 Claims, 1 Drawing Sheet

OTHER PUBLICATIONS

Andrew McLeish, "An improved process for the cryogenic grinding of flexible polyurethane foam", British Plastics & Rubber, Nov. 1995, p. 42-43.

Liz White, "Wider use needs quality supply", European Rubber Journal, Feb. 1995, vol. 177, No. 2, p. 24-25.

Defendants' Prior Art Statement and Invalidity Contentions in the United States District Court for the District of Colorado.

Plaintiff's Response to Defendants' Prior Art Statement and Invalidity Contentions in the United States District Court for the District of Colorado.

Attachment to Plaintiff's Response relating to Plaintiff's Claim Chart Responsive to Defedants' Prior Art Claim Chart in the United States District Court for the District of Colorado.

Preliminary Invalidity Contentions and Accompanying Production Under P.R. 3-3 and 3-4 in the United States District Court Southern District of Texas (Houston Division)—Please note that Plaintiff did not file a reply to the same.

Communications between Weatherford Artificial Airlift Systems and Cryotron (Canada) Ltd. (see p. 189 of Defendants' Prior Art Statement and Invalidity Contentions).

Purchase order from Weatherford Artificial Airlift Systems and invoice from Cryotron (Canada) Ltd. (see p. 189 of Defendants' Prior Art Statement and Invalidity Contentions).

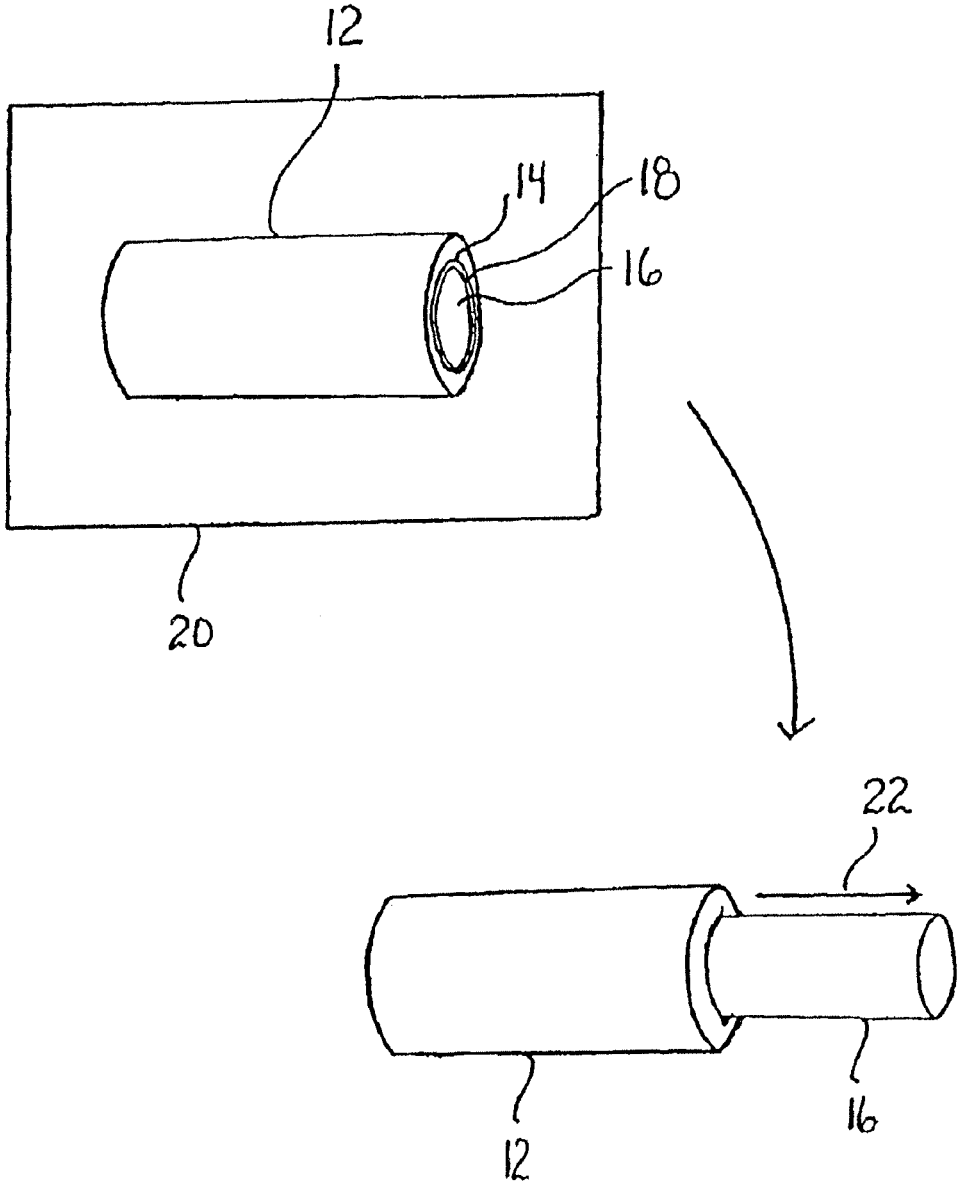
12
14
18
16
20
22
12
16

METHOD OF REMOVING STATORS FROM TUBULAR STATOR HOUSINGS

Matter enclosed in heavy brackets [ ] appears in the original patent but forms no part of the first and this reissue specification; matter printed in italics indicates the additions made by the first reissue. Matter enclosed in double heavy brackets [[ ]] appears in the first reissue patent but forms no part of this reissue specification; matter printed in bold face indicates the additions made by this reissue.

CROSS REFERENCE TO RELATED DOCUMENT

The present application claims the benefit of Canadian Application Serial No. 2,371,155 filed on Feb. 8, 2002.

FIELD OF THE INVENTION

The present invention relates to a method of removing stators of moineau style pumps from tubular stator housings.

BACKGROUND OF THE INVENTION

In the petroleum industry extensive use is made of moineau style pumps, so named after the french aviator who invented them. These pumps utilize metal rotors and polymer plastic rotors. The stator are secured with adhesive within a tubular stator housing. When a moineau style pump is new, there is a tight sealing engagement between the tubular stator housing and the stator. Upon rotation of the rotor, liquids are moved sequentially through a series of cavities formed between the tubular stator housing and the stator. After prolonged use the polymer plastic stator begins to wear and the rotor and stator are no longer able to move liquids efficiently due to inadequate sealing.

In order to service the moineau pump, the worn polymer plastic stator must be removed from the tubular stator housing and replaced with a new stator. At the present time the removal of the worn stator represents approximately one half of the cost of replacing the stator. Hydraulic or mechanical rams are used to break the bond of the adhesive and push the worn stator out of the stator housing. The tubular stator housing then must be reamed out to remove any residue of polymer plastic which remains.

SUMMARY OF THE INVENTION

What is required is a method of removing stators from tubular stator housings which will simplify removal and lower the cost of removal.

According to the present invention there is provided a method of removing stators from tubular stator housings, involving subjecting a tubular stator housing having an interior surface to which a worn stator is adhered by adhesive to cryogenic refrigeration until the stator shrinks and pulls away from the interior surface of the tubular stator housing.

The method, as described above, provides an alternative to the use of rams. More importantly, it removes the worn stator is a comparatively clean fashion thereby reducing the reaming and post reaming preparation of the interior surface of the tubular stator housing. Reducing reaming and post reaming preparation provides a substantial savings.

BRIEF DESCRIPTION OF THE DRAWINGS

These and other features of the invention will become more apparent from the following description in which reference is made to the appended drawings, the drawings are for the purpose of illustration only and are not intended to in any way limit the scope of the invention to the particular embodiment or embodiments shown, wherein:

FIG. 1 is a flow diagram representation of the removal of a stator from a tubular stator housing in accordance with the teachings of the present method.

DETAILED DESCRIPTION OF THE PREFERRED EMBODIMENT

The preferred method of removing stators from tubular stator housings will now be described with reference to FIG. 1.

Referring to FIG. 1, the preferred method involves subjecting a tubular stator housing 12 having an interior surface 14 to which a worn stator 16 is adhered by adhesive 18 to cryogenic refrigeration in a cryogenic refrigeration unit 20 until worn stator 16 shrinks and pulls away from interior surface 14 of tubular stator housing 12.

The cryogenic temperature range starts at approximately minus 50 degrees celsius. It will be understood that the method works on a combination of temperature and time. As the temperature is made colder within the cryogenic temperature range, the less time it takes for the worn stator to shrink sufficiently to pull away from interior surface 14. In tests proving the concept a temperature range of between minus 150 degrees celsius and minus 200 degrees celsius was used.

In order to avoid thermal shock, the temperature of tubular stator housing 12 must be gradually brought down into the cryogenic range and then gradually brought back up. In tests proving the concept the temperature was brought down by 2.5 degrees celsius per minute until minus 196 degrees celsius, the temperature of liquid nitrogen, was reached. Once worn stator 16 separated from tubular stator housing 12, the temperature was brought back up at the rate of 2.5 degrees celsius per minute. There was minimal dwell time required at minus 196 degrees celsius. The time consuming part of the process was in gradually bringing down and then bringing up the temperature, which took approximately 3 to 24 hours. Although the preferred range of between minus 150 degrees celcius to minus 200 celcius was used in tests, lower cryogenic temperatures may be used. Some experimentation would be required to determine the optimal temperature and dwell time.

Once worn stator 16 has shrunk and pulled away from interior surface 14, removal of worn stator 16 from tubular stator housing 12 becomes an extremely simple matter. Worn stator 16 is removed simply by exerting a force upon worn stator 16 to slide worn stator 16 out of tubular stator housing 12 as indicated by arrow 22. It will be understood that this can he done in any number of ways. It can he done by pushing or pulling upon worn stator 16. It can also be done by tipping tubular stator housing 12, so that stator 16 slides from tubular stator housing 12 by force of gravity. It can also be done by utilizing centrifugal force or other principles of physics.

Cautionary Note:

In most cases the cryogenic treatment will actually enhance the mechanical properties of tubular stator housing 12. Cryogenic treatments are used on metal to increase abrasion resistance, toughness, dimensional stability and tensile strength. However, there is a danger that ostentite will be transformed to martensite in some metals. In such cases, the virgin martensite will have to be tempered through a subsequent heat treatment.

It will be apparent to one skilled in the art that modifications may be made to the illustrated embodiment without departing from the spirit and scope of the invention as hereinafter defined in the Claims.

What is claimed is:

1. A method of removing stators from tubular stator housings, comprising the steps of:

placing a metal tubular stator housing having an interior surface to which a worn elastomer moineau-style stator is adhered by adhesive into a cryogenic refrigeration unit;

lowering the temperature in the cryogenic refrigeration unit gradually to cryogenic levels in order to avoid thermal shock to the tubular stator housing;

raising the temperature of the tubular stator housing gradually to ambient temperatures, the stator shrinking and pulling away from the interior surface of the tubular stator housing as the temperature is gradually lowered and then gradually raised.

2. The method as defined in claim 1, the tubular metal stator housing being subjected to temperatures between minus 150 degrees celsius and minus 200 degrees celsius.

3. The method as defined in claim 1, wherein the temperature in the cryogenic refrigeration unit is gradually decreased to cryogenic levels over a period of time of approximately 3 to 24 hours.

4. A method of removing stators from tubular stator housings, comprising the steps of:

placing a tubular metal stator housing having an interior surface to which a worn elastomer moineau-style stator is adhered by adhesive into a cryogenic refrigeration unit;

lowering the temperature in the cryogenic refrigeration unit gradually to cryogenic levels in order to have the tubular metal stator housing and the stator shrink at substantially the same rate and avoid thermal shock, the temperatures in the cryogenic refrigeration unit reaching temperatures of between minus 150 degrees celsius and minus 200 degrees celsius;

raising the temperature in the cryogenic refrigeration unit gradually to ambient temperatures in order to avoid thermal shock, the stator shrinking and pulling away from the interior surface of the tubular stator housing as the temperature is gradually lowered and then gradually raised; and exerting a force upon the stator to slide the stator out of the tubular stator housing.

5. The method as defined in claim 4, wherein the temperature in the cryogenic refrigeration unit is gradually decreased to cryogenic levels over a period of time of approximately 3 to 24 hours.

*6. A method of removing an elastomer moineau-style stator adhesively adhered to an interior surface of a metal tubular stator housing, the method comprising the steps of: placing the metal tubular stator housing, having the stator adhesively adhered to the interior surface of the stator housing, into a cryogenic refrigeration unit; gradually lowering the temperature in the cryogenic refrigeration unit to a cryogenic temperature of between minus 150 degrees celsius and minus 200 degrees celsius so as to avoid thermal shock to at least the metal tubular stator housing and cause the metal tubular stator housing and the stator to shrink at substantially a same rate; allowing the stator, at the cryogenic temperature, to substantially separate from the interior surface of the tubular stator housing during the gradually lowering the temperature in the cryogenic refrigeration unit; and*

*removing the stator from the housing following the gradually lowering the temperature in the cryogenic refrigeration unit.*

*7. The method of claim 6 further comprising the step of gradually lowering the temperature in the cryogenic refrigeration unit from a starting temperature of approximately minus 50 degrees celsius.*

*8. The method of claim 6 further comprising the steps of gradually raising the temperature of the tubular stator housing.*

*9. The method of claim 6 further comprising the step of gradually decreasing the temperature in the refrigeration unit at a rate of approximately 2.5 degrees celsius per minute.*

*10. The method of claim 6 further comprising the step of gradually decreasing the temperature in the refrigeration unit over a period of time of approximately 1 hour.*

*11. The method of claim 6 further comprising the step of gradually decreasing the temperature in the refrigeration unit to a temperature of approximately minus 196 degrees celsius.*

* * * * *